No. 823,384. PATENTED JUNE 12, 1906.
G. BARDET.
SPRING WHEEL.
APPLICATION FILED NOV. 13, 1905.

Witnesses:—

Inventor:—
Georgette Bardet
by H. B. Willson
Attorney

UNITED STATES PATENT OFFICE.

GEORGETTE BARDET, OF ST.-LEU-TAVERNY, FRANCE.

SPRING-WHEEL.

No. 823,384.　　　Specification of Letters Patent.　　　Patented June 12, 1906.

Application filed November 13, 1905. Serial No. 287,124.

*To all whom it may concern:*

Be it known that I, GEORGETTE BARDET, (née BON,) independent lady, a citizen of the Republic of France, residing at St.-Leu-Taverny, Rue de Boissy, Seine-et-Oise, in the Republic of France, have invented certain new and useful Improvements in Elastic or Spring Wheels for Vehicles, of which the following is a specification.

This invention relates to a wheel having an elastic or spring tire applicable to all kinds of vehicles. In this wheel the elastic or spring tire comprises a corrugated spring-strip which extends over the entire periphery and can be surrounded by a flexible ring, of leather or other material, serving as the tread of the tire. This strip is held by a series of pins or other suitable projections fixed to the rigid part of the wheel. These pins are freely engaged in the portions of the corrugations which have their concavities turned toward the exterior and form a kind of teeth engaging with those of the strip, while allowing the different parts of the latter to move toward the center of the wheel without meeting with any rigid obstacle. A sufficient length of this strip can be deflected at once, under a strain exerted at any point, so that the tire possesses great flexibility, and consequently runs with great ease. On the other hand, although the strip is very free in a radial direction it can be supported at numerous points in the direction of the periphery, so that it is compelled to turn with the rigid portion of the wheel. Instead of a single strip several strips can of course be employed arranged and operating under the same conditions.

To enable my invention to be fully understood, I will describe how it can be carried into practice by reference to the accompanying drawings, in which—

Figure 1:
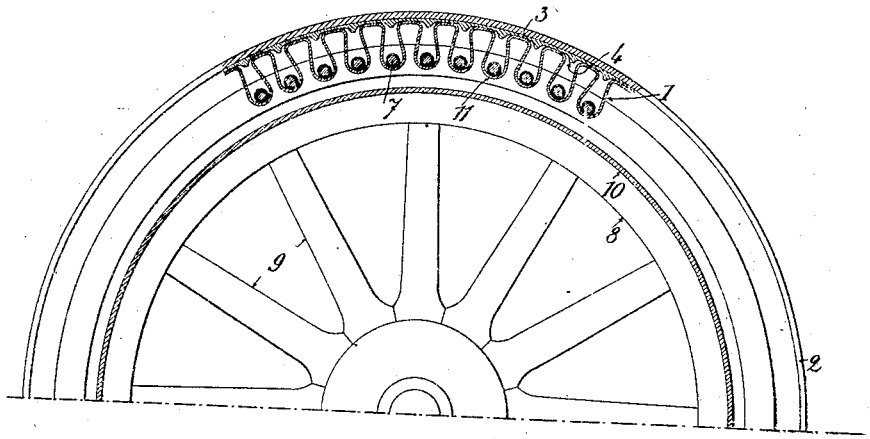
Figure 2:
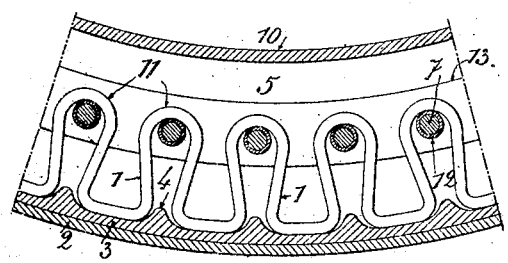
Figure 3:
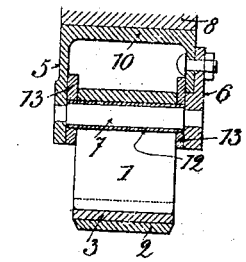
Figure 4:
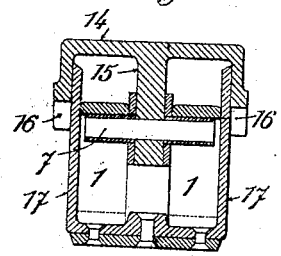
Figure 5:
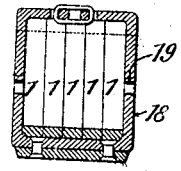

Figure 1 is a vertical section of an elastic or spring wheel constructed according to my invention. Figs. 2 and 3 are vertical sections, taken at right angles to each other and drawn to a larger scale, of a portion of the tire; and Figs 4 and 5 are transverse sections of modifications of the tire.

The elastic or spring portion of the tire, Figs. 1 to 3, consists of a corrugated spring-strip 1, extending over the entire periphery of the wheel. This strip is preferably continuous—that is to say, endless. Nevertheless, if required, the continuity may be interrupted at one or more points.

2 and 3 indicate bands of flexible material, such as leather, which form a tread around the strip 1. Projections 4, engaging between the projections of the corrugations of the strip, are formed on this tread and prevent its longitudinal displacement. Any suitable means may be employed for attaching the flexible bands over the spring-strip.

The rigid portion of the wheel may be of any suitable construction, provided that it comprises two parallel cheeks or sides 5 and 6, supporting the strip 1 transversely, and the pins 7 engaging in the corrugations of the said strip. In the form illustrated in Figs. 1 to 3 the cheek 5 is formed with a metal ring 10, fixed over the wooden rim 8 of a wheel having rigid spokes 9. The other cheek 6 is fixed to a flange on the ring 10, so that it can be removed for facilitating the placing of the strip 1 in position.

The pins 7 are shown in the form of tie-bars fixed to the cheeks 5 and 6. They may, however, consist of simple projections formed or fixed on each cheek. Their number is preferably equal to that of the corrugations of the strip. They can, however, be placed in alternate corrugations or in every third or other corrugation. The essential condition is to place the pins in the parts 11 of the corrugations which have their concavities turned toward outward in order that the strip may be freely deflected between the cheeks 5 and 6 toward the center of the wheel. To this end the space between the pins 7 and the ring 10 must be of such a depth that the strip will not meet any rigid support when displaced toward the center.

When a load is borne by the wheel, the lower part of the spring-tire becomes flattened and more or less pressed up between the cheeks 5 and 6. The lateral and upper parts cannot become displaced upwardly with relation to the pins 7; but the lower part is free to become deflected over a fairly extensive arc of a circle, so that it possesses great elasticity. An elastic tire of this description also presents considerable resistance to torsional strains—that is to say, it is little liable to become buckled. It possesses the advantage that it may be broken at any point without being rendered unserviceable, especially when the pins 7 are relatively numerous and close together.

Among the other advantages of my improved tire I may mention that the strip 1 may be placed in position without any initial tension, the deflecting portion is of considerable and constant length whatever may be the position of the wheel, the elasticity is equal at all points of the circumference of the wheel, since the strip is of the same section throughout and does not require to be perforated anywhere nor otherwise weakened, the deformations caused by obstacles, as by even ground, are always normal to the periphery, the tangential drawing of the tire by the rim takes place over a large part of the circumference, and the tire has a very high transverse section, while being very elastic, so that security as regards the resistance of the strip is as great as possible.

In order to prevent noise, the pins 7 may be made of a non-sonorous material or they may be covered with a sheath 12 which will deaden vibrations. The inner faces of the cheeks 5 and 6 may also be provided with linings 13 of fiber or other material, which will prevent any noisy metallic contact.

Fig. 4 shows a tire having two strips 1 placed in two circular grooves in a rim 14 of E shape in cross-section, the pins 7 in this case being fixed at their middle part in the rib 15 in the middle of the rim. The lateral cheeks of the rim are provided with recesses 16, corresponding to the corrugations of the strips and allowing the latter to be placed in position without the employment of removable cheeks. The strips are covered with a leather casing, the vertical edges 17 of which can slide along the inner sides of the lateral cheeks of the rim.

In Fig. 5 five strips 1 are placed side by side. They are completely inclosed in a casing 18, of leather or other material, the side portions of which are perforated with radial holes 19 for the passage of the pins 7. (Not shown.) The strips 1 and flexible jacket 18 are together placed in a hollow rim similar to that shown in Fig. 3 and can move radially therein, being guided by the pins 7, which slide in the apertures 19.

I claim—

In a wheel having an elastic tire, the combination of a hollow felly having two lateral cheeks and a median rib which form an E-shaped cross-section, pins secured to the median rib, and two undulated elastic rims the inner loops of which pass round the said pins and are capable of moving freely inward toward the bottom of the felly while the outer loops can slide freely between the said pins.

In testimony that I claim the foregoing as my invention I have signed my name in presence of two subscribing witnesses.

GEORGETTE BARDET.

Witnesses:
CAMILLE BLÉTRY,
F. W. CAULDWELL.